US009323228B2

(12) United States Patent
Zhu et al.

(10) Patent No.: US 9,323,228 B2
(45) Date of Patent: Apr. 26, 2016

(54) METHOD AND APPARATUS FOR WAKE-UP CONTROL OF INTELLIGENT TERMINAL BY DETERMINING WHETHER TO DELAY WAKE UP TIMES

(71) Applicant: Huawei Device Co., LTD, Shenzhen (CN)

(72) Inventors: Xiaoping Zhu, Beijing (CN); Yonghong Qiao, Beijing (CN); Bingtian Han, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/136,777

(22) Filed: Dec. 20, 2013

(65) Prior Publication Data

US 2014/0112111 A1    Apr. 24, 2014

Related U.S. Application Data (63) Continuation of application No. PCT/CN2012/080883, filed on Aug. 31, 2012.

(51) Int. Cl.
*G04G 13/02* (2006.01)
*G06F 1/00* (2006.01)
*H04W 52/02* (2009.01)
*H04W 76/04* (2009.01)

(52) U.S. Cl.
CPC ........... *G04G 13/02* (2013.01); *H04W 52/0251* (2013.01); *H04W 52/0264* (2013.01); *H04W 76/045* (2013.01); *H04W 76/046* (2013.01); *Y02B 60/50* (2013.01)

(58) Field of Classification Search
CPC .................... G06F 1/3203; H04W 52/0251
USPC .................... 713/300, 323; 368/250
See application file for complete search history.

(56) References Cited

U.S. PATENT DOCUMENTS

| 6,892,315 | B1 * | 5/2005 | Williams ............... 713/502 |
| 2004/0185857 | A1 | 9/2004 | Lee et al. | |
| 2007/0005995 | A1 * | 1/2007 | Kardach et al. ........... 713/300 |

(Continued)

FOREIGN PATENT DOCUMENTS

| CN | 1568579 A | 1/2005 |
| CN | 101610566 A | 12/2009 |

(Continued)

OTHER PUBLICATIONS

International Search Report and Written Opinion received in Application No. PCT/CN2012/080883 mailed May 23, 2013, 13 pages.

*Primary Examiner* — Thomas Lee
*Assistant Examiner* — Robert Cassity
(74) *Attorney, Agent, or Firm* — Slater & Matsil, L.L.P.

(57) ABSTRACT

The present invention provides a method and an apparatus for wake-up control of an intelligent terminal. At least two alarm set indications are sent by one or more applications of the intelligent terminal. The alarm set indication is used to indicate a first alarm wake-up time determined by the application for waking up the intelligent terminal. At least two of the at least two first alarm wake-up times corresponding to the at least two alarm set indications are delayed until a second alarm wake-up time. The second alarm wake-up time is determined according to preset adjustment control information. The intelligent terminal is welcome at the second alarm wake-up time.

20 Claims, 6 Drawing Sheets

(56) References Cited

U.S. PATENT DOCUMENTS

| | | | |
|---|---|---|---|
| 2008/0209244 A1* | 8/2008 | Miller et al. | 713/322 |
| 2011/0058510 A1* | 3/2011 | Thomas et al. | 370/311 |
| 2011/0059779 A1 | 3/2011 | Thomas et al. | |
| 2011/0066868 A1* | 3/2011 | Atkinson | 713/323 |
| 2011/0213992 A1* | 9/2011 | Satsangi et al. | 713/300 |
| 2012/0023190 A1* | 1/2012 | Backholm et al. | 709/217 |
| 2013/0080816 A1* | 3/2013 | Johnson et al. | 713/401 |
| 2013/0254256 A1 | 9/2013 | Fu | |
| 2014/0068303 A1* | 3/2014 | Hildebrand et al. | 713/323 |
| 2014/0195839 A1* | 7/2014 | Chueh et al. | 713/323 |

FOREIGN PATENT DOCUMENTS

| | | |
|---|---|---|
| CN | 101784009 A | 7/2010 |
| CN | 102076065 A | 5/2011 |

* cited by examiner

METHOD AND APPARATUS FOR WAKE-UP CONTROL OF INTELLIGENT TERMINAL BY DETERMINING WHETHER TO DELAY WAKE UP TIMES

This application is a continuation of International Application No. PCT/CN2012/080883, filed on Aug. 31, 2012, which is hereby incorporated by reference in its entirety.

TECHNICAL FIELD

The present invention relates to communication technologies and, in particular embodiments, to a method and an apparatus for wake-up control of an intelligent terminal.

BACKGROUND

Along with the popularization of an intelligent terminal, a consumer has increasingly large demand on the intelligent terminal, and also has increasingly high requirement on the intelligent terminal. By taking a smart phone in the intelligent terminal as an example, a user generally requires that an application, such as a mobile QQ, on the smart phone always keeps online, so that the user can receive a message at any time. However, if the application intends to always keep online, regular interaction with a network server is required. During the usage process of the smart phone, the phone is in a dormant state periodically to save the power consumption, and in order to satisfy the requirement of regular interaction with the network server, a phone system needs to be woken from the dormant state first, and then the phone can interact with the network server.

In specific implementation, each application on the smart phone generally has a function of alarm set, the application sends an alarm set indication (including an alarm set time) to an alarm manager service unit (Alarm Manager Service) on the smart phone, and the alarm manager service unit sets the alarm according to the indication and wakes up the smart phone from the dormant state at the time indicated by the alarm. Moreover, each application has an alarm, and the alarm manager service unit wakes up the phone in response to the alarm set indication of each application, respectively. However, many applications are set on the smart phone, the applications set the alarms continuously for regular interaction with the network server and causes frequent wake-up of the smart phone, and the wake-up causes relatively large power consumption of the phone, thereby reducing the standby time of the smart phone.

SUMMARY OF THE INVENTION

The present invention provides a method and an apparatus for wake-up control of an intelligent terminal, so as to reduce power consumption of the intelligent terminal.

A first aspect of the present invention provides a wake-up control method for an intelligent terminal. At least two alarm set indications are sent by one or more applications of the intelligent terminal. The alarm set indication is used to indicate a first alarm wake-up time determined by the application for waking up the intelligent terminal. At least two of the at least two first alarm wake-up times corresponding to the at least two alarm set indications are delayed until a second alarm wake-up time. The second alarm wake-up time is determined according to preset adjustment control information. The intelligent terminal is welcome at the second alarm wake-up time.

With reference to the first aspect, in a first possible implementation manner of the first aspect, the adjustment control information is periodically set heartbeat moments, the periodically set heartbeat moments include an $N^{th}$ heartbeat moment and an $(N+1)^{th}$ heartbeat moment that are adjacent to each other, the time of the $(N+1)^{th}$ heartbeat moment is later than that of the $N^{th}$ heartbeat moment, and the N is a natural number. The delaying at least two of multiple first alarm wake-up times until the second alarm wake-up time determined according to the preset adjustment control information includes, when at least two of the first alarm wake-up times exist between the $N^{th}$ heartbeat moment and the $(N+1)^{th}$ heartbeat moment, delaying at least two of the at least two first alarm wake-up times between the $N^{th}$ heartbeat moment and the $(N+1)^{th}$ heartbeat moment until the $(N+1)^{th}$ heartbeat moment, where the $(N+1)^{th}$ heartbeat moment is the second alarm wake-up time.

With reference to the first possible implementation manner of the first aspect, in a second possible implementation manner, a period of the heartbeat moment is set according to a longest tolerant delay time of the application.

With reference to the first aspect, in a third possible implementation manner, the adjustment control information is a longest tolerant delay time of the first alarm wake-up time; the second alarm wake-up time is the first alarm wake-up time with the latest time in the at least two first alarm wake-up times and is in a range of a longest tolerant delay time of the other first alarm wake-up time in the at least two first alarm wake-up times.

With reference to the third possible implementation manner of the first aspect, in a fourth possible implementation manner, the delaying at least two of the at least two first alarm wake-up times to the second alarm wake-up time includes determining whether the first alarm wake-up time corresponding to the currently received alarm set indication is in the range of the longest tolerant delay time, and the longest tolerant delay time including longest tolerant delay times which correspond to the other first alarm wake-up times before the first alarm wake-up time, respectively. If a judgment result is yes, delaying the other first alarm wake-up times until the first alarm wake-up time, and the first alarm wake-up time being the second alarm wake-up time; otherwise, determining the first alarm wake-up time with the latest time in the other first alarm wake-up times as the second alarm wake-up time, and delaying the other first alarm wake-up times until the second alarm wake-up time.

With reference to the first aspect, in a fifth possible implementation manner, the adjustment control information is the longest tolerant delay time of the first alarm wake-up time; the second alarm wake-up time is an earliest one in delayed times corresponding to the at least two first alarm wake-up times, and the delayed time is obtained after delaying the first alarm wake-up time by the corresponding longest tolerant delay time.

With reference to the first aspect, and any implementation manner of the first possible implementation manner of the first aspect to the fifth possible implementation manner of the first aspect, in a sixth possible implementation manner, the delaying the first alarm wake-up time until the second alarm wake-up time determined according to the preset adjustment control information includes: modifying at least two of the at least two first alarm wake-up times corresponding to the at least two alarm set indications into the second alarm wake-up time determined according to the preset adjustment control information.

A second aspect of the present invention provides a wake-up control method for an intelligent terminal, including receiving an alarm set indication sent by an application of the intelligent terminal, where the alarm set indication is used to indicate a first alarm wake-up time determined by the application for waking up the intelligent terminal, and a first time exists as an interval between the first alarm wake-up time and a first alarm wake-up time received last time, delaying the first alarm wake-up time until a second alarm wake-up time, where the second alarm wake-up time is an earliest heartbeat moment after the first alarm wake-up time in periodically set heartbeat moments, a set period of the heartbeat moment is a second time, and the second time is longer than the first time, and waking up the intelligent terminal at the second alarm wake-up time.

A third aspect of the present invention provides a wake-up control apparatus for an intelligent terminal, including an indication receiving unit, configured to receive at least two alarm set indications sent by one or more applications of the intelligent terminal, where the alarm set indication is used to indicate a first alarm wake-up time determined by the application for waking up the intelligent terminal, and a wake-up control unit, configured to delay, at least two of at least two first alarm wake-up times corresponding to the at least two alarm set indications, until a second alarm wake-up time determined according to preset adjustment control information, and wake up the intelligent terminal at the second alarm wake-up time.

With reference to the third aspect, in a first possible implementation manner of the third aspect, the wake-up control unit includes: an information storage subunit, configured to store the preset adjustment control information, where the adjustment control information is periodically set heartbeat moments, the periodically set heartbeat moments include an $N^{th}$ heartbeat moment and an $(N+1)^{th}$ heartbeat moment that are adjacent to each other, the time of the $(N+1)^{th}$ heartbeat moment is later than that of the $N^{th}$ heartbeat moment, and the N is a natural number; a delay processing subunit, configured to delay at least two of the at least two first alarm wake-up times between the $N^{th}$ heartbeat moment and the $(N+1)^{th}$ heartbeat moment until the $(N+1)^{th}$ heartbeat moment, where the $(N+1)^{th}$ heartbeat moment is the second alarm wake-up time, and the at least two first alarm wake-up times exist between the $N^{th}$ heartbeat moment and the $(N+1)^{th}$ heartbeat moment; and a wake-up triggering subunit, configured to control waking up the intelligent terminal at the second alarm wake-up time.

With reference to the third aspect, in a second possible implementation manner of the third aspect, the wake-up control unit includes: an information storage subunit, configured to store the preset adjustment control information, where the adjustment control information is a longest tolerant delay time of the first alarm wake-up time; a delay processing subunit, configured to delay at least two of the at least two first alarm wake-up times until a second alarm wake-up time, where the second alarm wake-up time is the first alarm wake-up time with the latest time in the at least two first alarm wake-up times and is in a range of a longest tolerant delay time of the other first alarm wake-up time in the at least two first alarm wake-up times; and a wake-up triggering subunit, configured to wake up the intelligent terminal at the second alarm wake-up time.

With reference to the second possible implementation manner of the third aspect, in a third possible implementation manner, the delay processing subunit includes a tolerance judging subunit is configured to judge whether the first alarm wake-up time corresponding to the currently received alarm set indication is in the range of the longest tolerant delay time, and the longest tolerant delay time including longest tolerant delay times corresponding to other first alarm wake-up times before the first alarm wake-up time. A delay determining subunit is configured to, when a judgment result is yes, delay the other first alarm wake-up times until the first alarm wake-up time. The first alarm wake-up time is the second alarm wake-up time. Otherwise, the delay determining subunit is configured to determine the first alarm wake-up time with the latest time in the other first alarm wake-up times to be the second alarm wake-up time, and delay the other first alarm wake-up times until the second alarm wake-up time. The other first alarm wake-up times are at least two of the first alarm wake-up times.

With reference to the third aspect, in a fourth possible implementation manner, the wake-up control unit includes an information storage subunit is configured to store the preset adjustment control information. The adjustment control information is a longest tolerant delay time of the first alarm wake-up time. A delay processing subunit is configured to delay at least two of the at least two first alarm wake-up times until a second alarm wake-up time, where the second alarm wake-up time is an earliest one in delayed times corresponding to the at least two first alarm wake-up times, and the delayed time is obtained after delaying the first alarm wake-up time by the corresponding longest tolerant delay time. A wake-up triggering subunit is configured to wake up the intelligent terminal at the second alarm wake-up time.

With reference to the third aspect, and any implementation manner of the first possible implementation manner of the third aspect to the fourth possible implementation manner of the third aspect, in a fifth possible implementation manner, the wake-up control unit is specifically configured to modify at least two of the at least two first alarm wake-up times corresponding to the at least two alarm set indications into the second alarm wake-up time determined according to the preset adjustment control information.

A fourth aspect of the present invention provides a wake-up control apparatus for an intelligent terminal, including an indication receiving unit, configured to receive an alarm set indication sent by an application of the intelligent terminal, where the alarm set indication is used to indicate a first alarm wake-up time determined by the application for waking up the intelligent terminal, and a first time exists as an interval between the first alarm wake-up time and a first alarm wake-up time received last time, and a wake-up control unit, configured to delay the first alarm wake-up time until a second alarm wake-up time, where the second alarm wake-up time is an earliest heartbeat moment after the first alarm wake-up time in periodically set heartbeat moments, a set period of the heartbeat moment is a second time, and the second time is longer than the first time; and wake up the intelligent terminal at the second alarm wake-up time.

The technical effect of the method and the apparatus for wake-up control of the intelligent terminal provided in the present invention is that: by delaying, multiple first alarm wake-up times determined by the application, until the second alarm wake-up time, the intelligent terminal is woken only at the second alarm wake-up time, and therefore, as compared with the prior art where the intelligent terminal is woken at multiple first alarm wake-up times, the number of wake-ups of the intelligent terminal is significantly reduced, thereby reducing the power consumption of the intelligent terminal.

DETAILED DESCRIPTION OF ILLUSTRATIVE EMBODIMENTS

Figure 1:
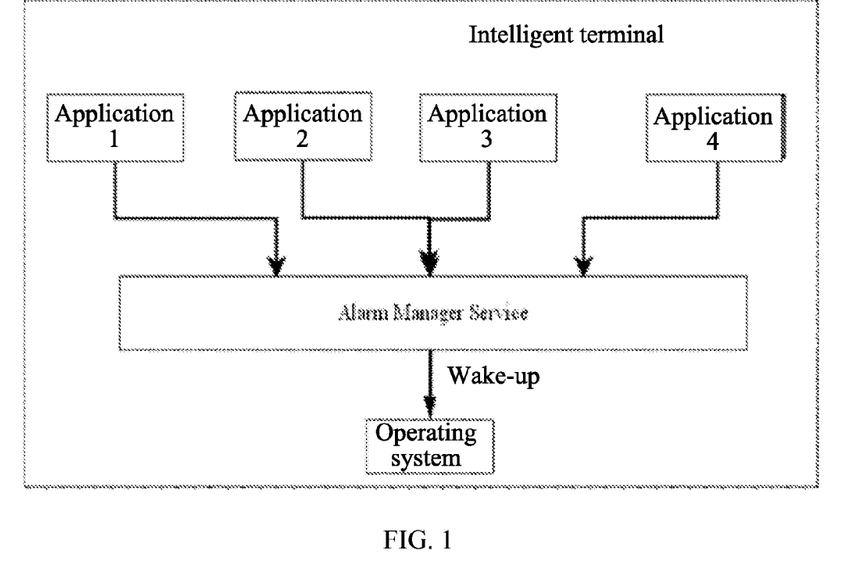
FIG. 1 is an architectural diagram of an application system of an embodiment of a wake-up control method for an intelligent terminal of the present invention.

In order to make illustration of a wake-up control method for an intelligent terminal in embodiments of the present invention clearer, system architecture applied by the method is provided first. FIG. 1 is an architectural diagram of an application system of an embodiment of a wake-up control method for an intelligent terminal of the present invention, as shown in FIG. 1, multiple applications generally run in the intelligent terminal, for example, an application 1, an application 2, an application 3, and an application 4. The applications, for example, can be a mobile QQ, Tencent WeChat. The system further includes an alarm manager service unit Alarm Manager Service, and an operating system, and so on; the intelligent terminal further includes another conventional structure, and the another structure is not further illustrated in FIG. 1.

The Alarm Manager Service is configured to provide an alarm manager service, and specifically, according to the indications of the applications, wake up the intelligent terminal in a dormant state at an alarm wake-up time indicated by an application, so that the intelligent terminal can connect to a network server of the application, thereby satisfying the interaction requirement of the application and the network server. In specific implementation, the wake-up may be triggered through setting on the operating system by the Alarm Manager Service. The alarm Alarm is similar to an alarm clock, and an alarm expiration time is similar to the time when the alarm goes off, where the time when the alarm goes off is set by the alarm. As long as the alarm expiration time is reached, it indicates that the alarm expires and then the waking up of the operating system is executed. In order to indicate more visually that the wake-up is executed at the alarm expiration time, in the embodiments of the present invention, the alarm expiration time is referred to as an alarm wake-up time.

The wake-up control method for the intelligent terminal of the embodiments of the present invention is described in detail in the following, and the method is described from the perspective of execution of the Alarm Manager Service.

Figure 2:
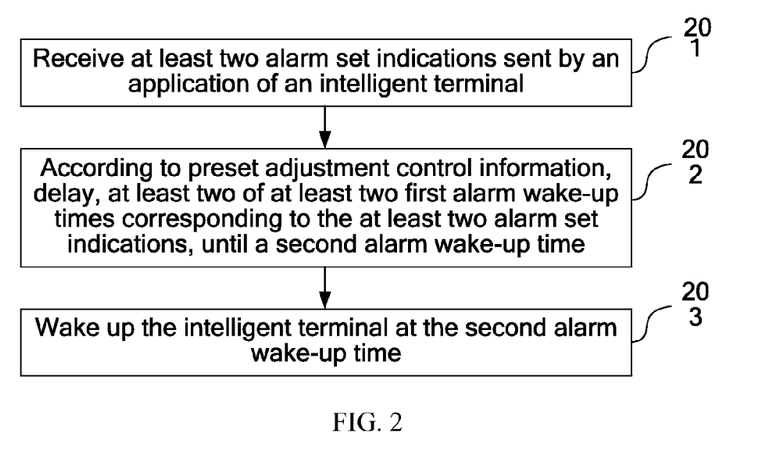
FIG. 2 is a schematic flow chart of an embodiment of a wake-up control method for an intelligent terminal of the present invention.

A first embodiment will now be described. FIG. 2 is a schematic flow chart of an embodiment of a wake-up control method for an intelligent terminal of the present invention, and the method is executed by an Alarm Manager Service. As shown in FIG. 2, the method may include the following steps.

201: Receive at least two alarm set indications sent by an application of the intelligent terminal.

Multiple applications generally run on the intelligent terminal, for example, the application 1, the application 2, the application 3, and the application 4. The application needs to interact with a network server regularly to satisfy the online requirement of an end user, and therefore, the applications set an alarm Alarm continuously so as to wake up the intelligent terminal in a dormant state at the alarm wake-up time specified by the Alarm and connect to the network server.

In specific implementation, the application setting the Alarm is implemented by sending a request to the Alarm Manager Service, the application sends an alarm set indication to the Alarm Manager Service, the indication is used to wake up the intelligent terminal at a specific time, and the specific time refers to the alarm wake-up time. The time determined by the application may be referred to as a first alarm wake-up time. It should be noted that, in the embodiment of the present invention, the first alarm wake-up time refers to the time that can be delayed, for example, if the time corresponding to the alarm set indication sent by a certain application is not allowed to be delayed (which may be specifically determined by the work of the application), the time cannot be referred to as the first alarm wake-up time.

For example, the application may carry in the indication a specific moment of the alarm wake-up time, for example, at 5 minutes and 20 seconds; the Alarm Manager Service sets the alarm wake-up time accordingly, that is, sets the Alarm to wake up the system at 5 minutes and 20 seconds (it is assumed that the system is in the dormant state), and connects to the server to perform data service (if it is required by the application). If the application, when setting the Alarm, indicates that the alarm is periodical, when the Alarm expires, that is, the alarm wake-up time is reached, the Alarm Manager Service automatically sets a next Alarm expiration time, that is, the alarm wake-up time. As for a certain alarm of a single application, the alarm set indication is generally sent one by one, for example, an indication is sent to the Alarm Manager Service at a certain moment, so as to indicate the alarm wake-up time of a first Alarm; after the first Alarm expires, an indication is sent to the Alarm Manager Service again, so as to indicate the alarm wake-up time of a second Alarm; and therefore, the Alarm Manager Service sets the Alarms one by one according to the indications of the application.

The multiple alarm set indications sent by the application in this embodiment may be multiple alarm set indications sent by one application, and may also be multiple alarm set indications sent by more than one application; generally may be multiple alarm set indications sent by multiple applications, respectively; for example, an indication 1 is sent by the application 1, an indication 2 is sent by the application 2, an indication 3 is sent by the application 3, an indication 4 is sent by the application 4, and the indication 1 to the indication 4 are the multiple alarm set indications. Moreover, the multiple alarm set indications generally have different alarm wake-up times; for example, the indication 1 indicates expiring at 5 minutes and 20 seconds, the indication 2 indicates expiring at 6 minutes and 30 seconds, the indication 3 indicates expiring at 9 minutes and 10 seconds, and so on. The specific set time is determined by the applications; and even if a part of the wake-up times in the alarm wake-up times indicated by the multiple alarm set indications are the same, the processing is still executed according to the wake-up control method of this embodiment.

202: According to preset adjustment control information, delay, at least two of the at least two first alarm wake-up times corresponding to the at least two alarm set indications, until a second alarm wake-up time.

In this embodiment, the at least two first alarm wake-up times correspond to the at least two alarm set indications, and each alarm set indication indicates a first alarm wake-up time. The Alarm Manager Service may merge the first alarm wake-up times of the received at least two alarm set indications, for example, may merge the times at a certain moment, and the alarm expires at the moment, that is, executes the wake-up. Specifically, at least two of the at least two first alarm wake-up times may be delayed for wake-up, for example, when three or more first alarm wake-up times exist, two first alarm wake-up times among them may be delayed for performing the wake-up, and more than two first alarm wake-up times may also be delayed for wake-up, or all of the first alarm wake-up times are delayed for wake-up.

For example, the indication 1 indicates expiring at 5 minutes and 20 seconds, the indication 2 indicates expiring at 6 minutes and 30 seconds, the indication 3 indicates expiring at 9 minutes and 10 seconds, and the indication 4 indicates expiring at 10 minutes and 05 seconds; and therefore, the Alarm Manager Service may delay all the times set by the indication 1 to the indication 4, the Alarm Manager Service may determine to expire at 11 minutes and 02 seconds, and do not expire, that is, do not perform wake-up, at the times indicated by the indication 1 to the indication 4. The intelligent terminal is woken at 11 minutes and 02 seconds, the application 1 to application 4 corresponding to the indication 1 to indication 4, respectively, may all run at this moment and interact with respective network servers, and after the four applications complete the interaction, the connection with the network server is broken.

The Alarm Manager Service delays the first alarm wake-up times according to preset adjustment control information, and the time for merging the multiple delayed first alarm wake-up times may be referred to as a second alarm wake-up time. The second alarm wake-up time is determined according to the adjustment control information, for example, when the adjustment control information is multiple periodically set heartbeat moments, the second alarm wake-up time may be one of the heartbeat moments; and when the adjustment control information is a longest tolerant delay time of a certain application, the second alarm wake-up time may be a certain first alarm wake-up time in the range of the longest tolerant delay time. The specific adjustment may be referred to description of Embodiment 2 and Embodiment 3; and the longest tolerant delay time is the longest delay time which can be tolerated without influencing the normal running of the application.

In the embodiment of the present invention, the manner of delaying the first alarm wake-up time until the second alarm wake-up time is illustrated by taking modifying the first alarm wake-up time into the second alarm wake-up time as an example; however, in specific implementation, another delay manner may also be used, for example, the first alarm wake-up time is not modified, but the wake-up is not executed, and the wake-up is executed until the second alarm wake-up time.

203: Wake up the intelligent terminal at the second alarm wake-up time.

The Alarm Manager Service wakes up the intelligent terminal at the determined second alarm wake-up time.

In the following Embodiment 2 and Embodiment 3, two feasible delay manners for the alarm wake-up time are illustrated by examples, respectively, moreover, a smart phone adopting an Android system is taken as an example; however, the method in the embodiment of the present invention is not limited to this, for example, the method may further be applied to a similar intelligent terminal with another system, such as a smart tablet computer and an Ultrabook, which can similarly achieve the effect of reducing the power consumption of the terminal.

Figure 3:
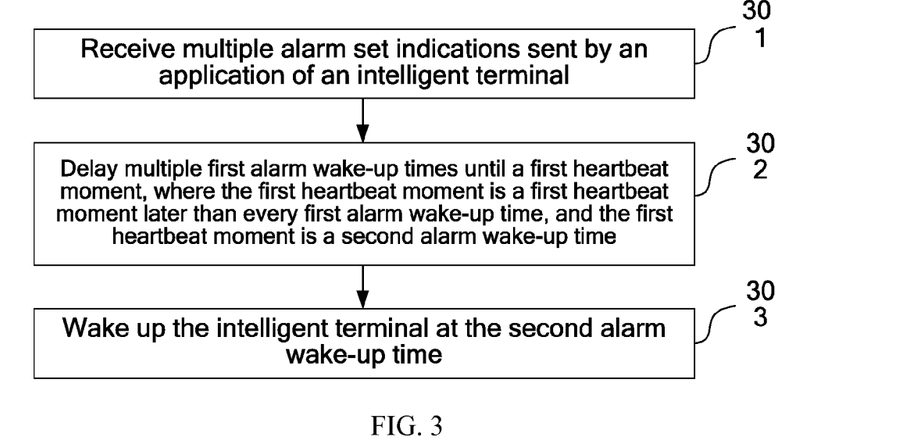
FIG. 3 is a schematic flow chart of another embodiment of a wake-up control method for an intelligent terminal of the present invention.

Embodiment 2 will now be described. FIG. 3 is a schematic flow chart of another embodiment of a wake-up control method for an intelligent terminal of the present invention. Adjustment control information in this embodiment is periodically set heartbeat moments, that is, periodical heartbeat moments having a fixed time interval, and a second alarm wake-up time is determined according to the heartbeat moment. For example, the heartbeat moments include an $N^{th}$ heartbeat moment and an $(N+1)^{th}$ heartbeat moment that are adjacent to each other, the time of the $(N+1)^{th}$ heartbeat moment is later than that of the $N^{th}$ heartbeat moment, and N is a natural number. At least two in multiple first alarm wake-up times between the $N^{th}$ heartbeat moment and the $(N+1)^{th}$ heartbeat moment may be delayed until the $(N+1)^{th}$ heartbeat moment, and the $(N+1)^{th}$ heartbeat moment is the second alarm wake-up time.

Specifically, as shown in FIG. 3, the method may include.

301: Receive multiple alarm set indications sent by an application of the intelligent terminal.

Figure 4:
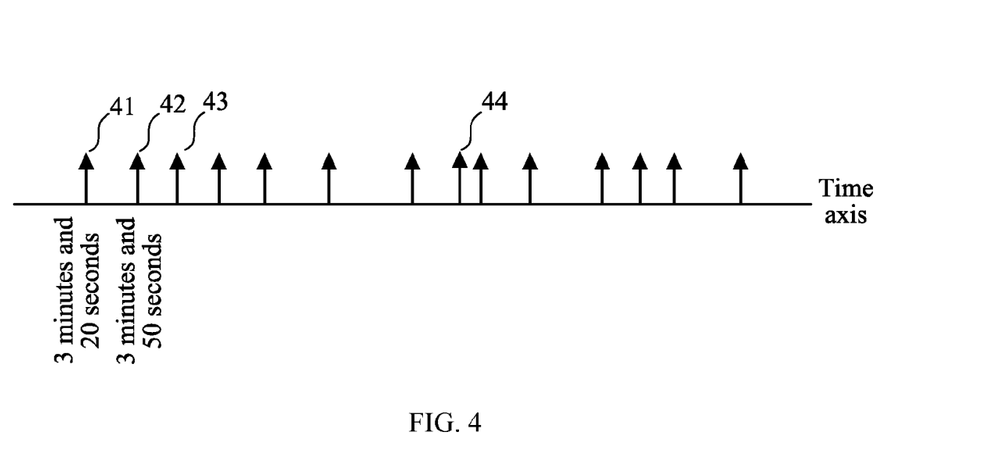
FIG. 4 is an initial timing and sequence diagram of an alarm in another embodiment of a wake-up control method for an intelligent terminal of the present invention.

Reference will now be made to FIG. 4, FIG. 4 is an initial timing and sequence diagram of an alarm in another embodiment of a wake-up control method for an intelligent terminal of the present invention. FIG. 4 shows multiple first alarm wake-up times (each upward arrow line indicates a first alarm wake-up time) sent by applications on a time axis. It should be noted that, in this embodiment, multiple first alarm wake-up times in a period of time are displayed at the same time, but actually, only one or several few first alarm wake-up times possibly exist on the time axis at a certain moment, for example, it is assumed that FIG. 4 shows a time period from the moment at 3 minutes and 10 seconds to the moment at 9 minutes and 20 seconds, and it is assumed that a first arrow line indicates that the moment at 3 minutes and 20 seconds is a first alarm wake-up time 41 set by an application 1, and other first alarm wake-up times are received subsequently, for example, a first alarm wake-up time 42 is received after the first alarm wake-up time 41. That is, FIG. 4 shows multiple first alarm wake-up times appeared on the time axis in a certain period of time only for the clarity of the description of the method, but the multiple first alarm wake-up times may be received successively, the indications of the first alarm wake-up times are determined by the applications themselves, and the Alarm Manager Service only receives the first alarm wake-up times.

Referring to FIG. 4, multiple alarm set indications sent by the application in this embodiment are assumed to be multiple alarm set indications sent by multiple applications, respectively, for example, a first alarm wake-up time 41 is an alarm time indicated by the application 1, a first alarm wake-up time 42 is an alarm time indicated by an application 2, a first alarm wake-up time 43 is an alarm time indicated by an application 3, and so on. Moreover, the application requires to interact with a network server regularly, the application may indicate the first alarm wake-up time periodically, for example, a first alarm wake-up time 44 in FIG. 4 is possibly indicated by the application 1 again, that is to say, the application 1 periodically instructs the Alarm Manager Service to set the alarm to wake up the intelligent terminal. It can be seen from FIG. 4 that, multiple first alarm wake-up times on the time axis are different, for example, the first alarm wake-up time 41 is at 3 minutes and 20 seconds, and the first alarm wake-up time 42 is at 3 minutes and 50 seconds.

302: Delay the multiple first alarm wake-up times until a first heartbeat moment, where the first heartbeat moment is a first heartbeat moment later than every first alarm wake-up time, and the first heartbeat moment is the second alarm wake-up time.

Figure 5:
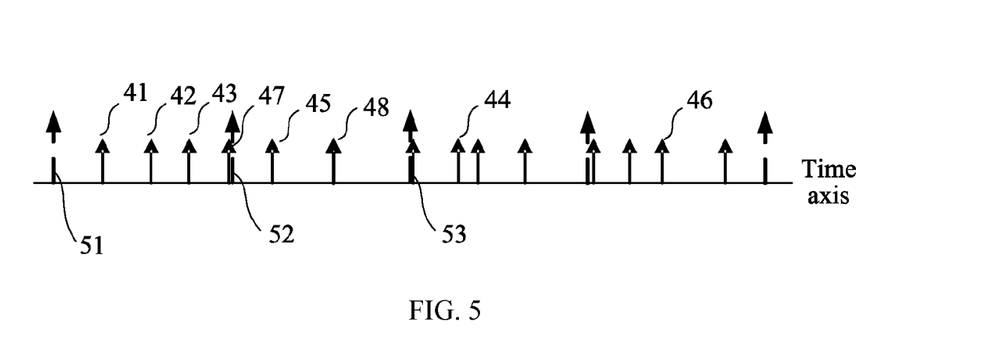
FIG. 5 is a schematic diagram of heartbeat moment setting in another embodiment of a wake-up control method for an intelligent terminal of the present invention.

In this embodiment, multiple first alarm wake-up times on the time axis shown in FIG. 4 are delayed, and the multiple first alarm wake-up times are merged to the same heartbeat moment. A specific manner is as follows: FIG. 5 is a schematic diagram of heartbeat moment setting in another embodiment of a wake-up control method for an intelligent terminal of the present invention, as shown in FIG. 5, dashed arrow lines represent heartbeat moments, the heartbeat moments are some alarm wake-up times additionally set by the Alarm Manager Service beyond the first alarm wake-up times sent by the applications in this embodiment; such as, a heartbeat moment 51, a heartbeat moment 52, and a heartbeat moment 53. The heartbeat moments are set periodically in this embodiment, that is, have a fixed interval, for example, a heartbeat moment may be set every 5 minutes.

Figure 6:
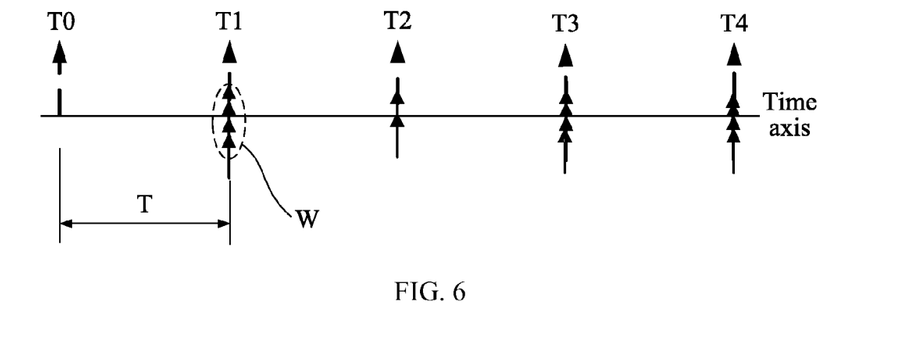
FIG. 6 is a schematic diagram of merging of alarm wake-up times in another embodiment of a wake-up control method for an intelligent terminal of the present invention.

FIG. 6 is a schematic diagram of merging of alarm wake-up times in another embodiment of a wake-up control method for an intelligent terminal of the present invention, and FIG. 6 shows a state after the multiple first alarm wake-up times are all delayed until the same heartbeat moment. The method of this embodiment is illustrated in the following with reference to FIG. 5 and FIG. 6.

In specific implementation, the Alarm Manager Service may delay the received first alarm wake-up time until the first heartbeat moment that is later than the first alarm wake-up time by adopting the following algorithm, that is, "$Tx\_new=T0+T*[(Tx-T0)/T+1]$"; where TX is a certain first alarm wake-up time, Tx_new is the time after the TX is delayed (actually, it is also the time when the TX is delayed until the first heartbeat moment); T0 is the first heartbeat moment on the time axis shown in FIG. 6; T is a set period of the heartbeat moment. For example: by taking the first alarm wake-up time 41 as an example, according to the foregoing formula, $(Tx-T0)/T$ should be a fraction less than 1, for example, 0.25, and in this case, the result should be rounded, that is, a value of 0 is obtained, and then, $Tx\_new=T0+T*(0+1)=T0+T=T1$ is obtained, that is, the first alarm wake-up time 41 is to be delayed until T1. For another example: by taking a first alarm wake-up time 46 as an example, according to the foregoing formula, $(Tx-T0)/T$ should be a fraction greater than 3, for example, 3.4, the result is rounded to obtain a value of 3, and then $Tx\_new=T0+T*(3+1)=T0+T*4=T4$ is obtained, that is, the first alarm wake-up time 46 is to be delayed to T4.

Particularly, a certain first alarm wake-up time TX may actually just overlap a certain heartbeat moment, it is assumed that the TX just overlaps the heartbeat moment T2, if determine according to the foregoing formula, $Tx\_new=T0+T*[2+1]=T0+T*3=T3$. Alternatively, preferentially, adjustment may not be performed on the first alarm wake-up time TX, the Alarm Manager Service may first calculate $(Tx-T0)/T$, and judge whether the result is an integer, if the result is an integer, it indicates that the TX just overlaps a certain heartbeat moment, and the Alarm Manager Service does not adjust the TX; otherwise, if the result is not an integer, the Alarm Manager Service continuously determines, according to the foregoing formula, the heartbeat moment until which the TX is delayed, for example, modifies TX into TX_new.

What is illustrated in the foregoing is only an optional algorithm for determining the heartbeat moment until which the first alarm wake-up time is delayed, and specific implementation is not limited to this, as long as the Alarm Manager Service can delay multiple first alarm wake-up times until the first heartbeat moment. For example, after receiving the first alarm wake-up time, the Alarm Manager Service may compare the first alarm wake-up time with heartbeat moments, and because the heartbeat moments are determined by the Alarm Manager Service itself, the Alarm Manager Service can know the location of each heartbeat moment, and the Alarm Manager Service can determine that the first alarm wake-up time is between which two heartbeat times, and can determine which first heartbeat moment is after the first alarm wake-up time, so as to delay the first alarm wake-up time until the heartbeat moment. For example, the Alarm Manager Service may determine that the first alarm wake-up time 41 is between T0 and T1 (since the Alarm Manager Service knows the moments of T0, T1, and the first alarm wake-up time 41, and many manners may be used to specifically judge that the first alarm wake-up time 41 is between T0 and T1, for example, performing time comparison), so that the Alarm Manager Service modifies the first alarm wake-up time 41 into T1, that is, delays the first alarm wake-up time 41 until T1.

In this embodiment, with reference to what are shown in FIG. 5 and FIG. 6, four first alarm wake-up times (the four shown by W in FIG. 6) are merged at the heartbeat moment T1, two first alarm wake-up times are merged at the heartbeat moment T2, and four first alarm wake-up times are merged at the heartbeat moments T3 and T4, respectively. According to the original alarm set timing and sequence (the timing and sequence in FIG. 4) on the time axis, the intelligent terminal is woken for 14 times (this is because an alarm is set at the location of each first alarm wake-up time, and the intelligent terminal is woken accordingly), and after the merging of this embodiment, the multiple first alarm wake-up times are all delayed to a certain heartbeat moment, and the intelligent terminal is only woken for 5 times, that is, Alarm is set only at the moment of T0, T1, T2, T3 and T4 shown in FIG. 6, to wake up the intelligent terminal, thereby greatly reducing the system power consumption of the intelligent terminal.

It should be noted that, the set period of the heartbeat moment in this embodiment may be adjusted, but should not influence the normal running of the application, and therefore, the period may be set specifically according to the longest tolerant delay time of the application, and cannot exceed the longest tolerant delay time. The wake-up time corresponding to the alarm set indication is set by the application according to its timing and the interaction requirement with the network server, generally has certain limits, and cannot be delayed randomly; further, in the foregoing processing process of merging multiple wake-up times into the second alarm wake-up time according to the heartbeat moment, if wake-up times indicated by some special application cannot be adjusted, the times of the applications are ignored and not adjusted, and the wake-up of the intelligent terminal is still executed according to the wake-up time indicated by the application.

For example, if the Alarm Manager Service receives an alarm set indication sent by a certain application, the indicated wake-up time is, for example, at 5 minutes and 20 seconds; the Alarm Manager Service first judges whether the wake-up time is allowed to be adjusted, and in specific implementation, information of the application not allowing the wake-up time indicated by the alarm set indication to be adjusted is stored in advance in the Alarm Manager Service, for example, the wake-up times indicated by the application 1 are not allowed to be adjusted, and when receiving the alarm set indication, the Alarm Manager Service may judge whether the application sending the alarm set indication is the application 1. If yes, it is determined that the wake-up time corresponding to the alarm set indication is not allowed to be adjusted, and the Alarm Manager Service does not adjust the wake-up time, keeps the wake-up time unchanged and wakes up the intelligent terminal at this moment; otherwise, if the application is not the application 1, it indicates that the wake-up time corresponding to the alarm set indication is allowed to be adjusted, and can be referred to as the first alarm wake-up time, and then the Alarm Manager Service, according to the foregoing manner, delays the first alarm wake-up time corresponding to the alarm set indication until the first heartbeat moment later than the first alarm wake-up time.

303: Wake up the intelligent terminal at the second alarm wake-up time.

The Alarm Manager Service, after delaying the multiple first alarm wake-up times until the first heartbeat moment later than the first alarm wake-up time, wakes up the intelligent terminal at the first heartbeat moment, that is, each heartbeat moment T0 to T4 in FIG. 6, and the specific manner of waking up the intelligent terminal is a conventional art, which is not repeatedly described.

As described at the beginning of this embodiment, as for the $N^{th}$ heartbeat moment and the $(N+1)^{th}$ heartbeat moment, N is a natural number, in the foregoing embodiment, illustration is made by taking N being a number greater than or equal to 1 as an example, for example, the "heartbeat moment 51 and heartbeat moment 52" shown in FIG. 5 may be the "first heartbeat moment and second heartbeat moment" or may also be the "fourth heartbeat moment and fifth heartbeat moment" on the whole time axis (in this case, the heartbeat moments at the front are not shown on the time axis of FIG. 5). Moreover, when N is 0, by taking FIG. 5 as an example, it is equivalent to the heartbeat moment 51 not existing, and only the heartbeat moment 52 exists after the first alarm wake-up times 41 to 43, and in this way, the heartbeat moment 52 is actually the first heartbeat moment since no heartbeat moment exists at the front. In this embodiment, the first alarm wake-up times are mainly delayed to the first heartbeat moment later than the first alarm wake-up times.

Figure 7:
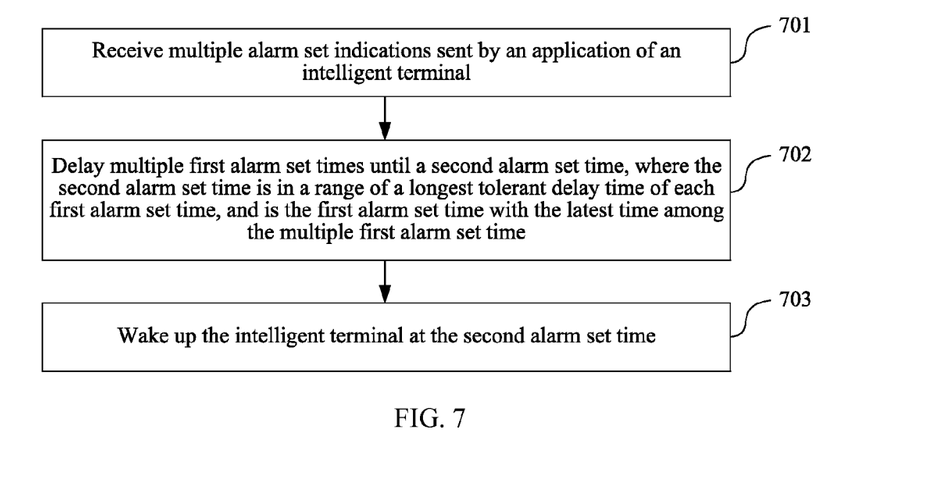
FIG. 7 is a schematic flow chart of another embodiment of a wake-up control method for an intelligent terminal of the present invention.

Embodiment 3 will now be described. FIG. 7 is a schematic flow chart of another embodiment of a wake-up control method for an intelligent terminal of the present invention, and adjustment control information in this embodiment is a longest tolerant delay time of the first alarm wake-up time.

As shown in FIG. 7, the method may include.

701: Receive multiple alarm set indications sent by an application of the intelligent terminal.

An alarm timing and sequence determined in the multiple alarm set indications received by an Alarm Manager Service still takes the alarm timing and sequence shown in FIG. 4 as an example, and for the illustration to the timing and sequence, reference may be made to Embodiment 2, which is not repeatedly described.

702: Delay multiple first alarm wake-up times until a second alarm wake-up time, the second alarm wake-up time is in a range of the longest tolerant delay time of each first alarm wake-up time, and is the first alarm wake-up time with the latest time in the multiple first alarm wake-up times.

An optional manner of delaying the multiple first alarm wake-up times until the second alarm wake-up time is illustrated by an example in the following: the Alarm Manager Service receives the first alarm wake-up times one by one, respectively, and judges the longest tolerant delay time of each first alarm wake-up time step by step, that is, judgment is performed every time a first alarm wake-up time is received. The example is described as follows.

First step: Receive a first alarm wake-up time 41 and a first alarm wake-up time 42.

The Alarm Manager Service may receive first alarm wake-up times indicated by multiple applications on the intelligent terminal, and with reference to FIG. 4, it is assumed that the current Alarm Manager Service receives an alarm set indication corresponding to the first alarm wake-up time 41, then receives a set indication of the first alarm wake-up time 42, and in this case, the first alarm wake-up time 41 does not reach yet. When receiving the indication of the first alarm wake-up time 42, the Alarm Manager Service judges whether the first alarm wake-up time 42 is in the range of the longest tolerant delay time of the first alarm wake-up time 41.

Specifically, the Alarm Manager Service determines the longest tolerant delay time of the first alarm wake-up time 41, where the longest tolerant delay time is the longest delay time which can be tolerated without influencing the normal running of an application 1; for example, the longest tolerant delay time is 2 minutes, it indicates that the first alarm wake-up time 41 indicated by the application can be delayed for 2 minutes at most before wake-up is performed. If the Alarm Manager Service determines that the first alarm wake-up time 42 is in the range of the longest tolerant delay time of the first alarm wake-up time 41, that is, the application allows the first alarm wake-up time 41 to be delayed until the first alarm wake-up time 42, the Alarm Manager Service executes: delaying the first alarm wake-up time 41 until the first alarm wake-up time 42, which indicates that the wake-up is not executed when the first alarm wake-up time 41 reaches, and the time for wake-up is delayed until the first alarm wake-up time 42. The first alarm wake-up time 42 is referred to the second alarm wake-up time.

Second step: Receive a first alarm wake-up time 43.

In this case, it is assumed that the current time does not reach the first alarm wake-up time 42, and the Alarm Manager Service receives the indication of the first alarm wake-up time 43, the Alarm Manager Service continues to judge: whether the first alarm wake-up time 43 is in the range of the longest tolerant delay time of the first alarm wake-up time 41, meanwhile, whether the first alarm wake-up time 43 is in a range of a longest tolerant delay time of the first alarm wake-up time 42. If the first alarm wake-up time 43 satisfies the limit of the longest tolerant delay times of the previous two first alarm wake-up times, that is, is in the range of the previous two longest tolerant delay times, the Alarm Manager Service executes: delaying the first alarm wake-up time 41 and the first alarm wake-up time 42 until the first alarm wake-up time 43. In this case, the first alarm wake-up time 43 is referred to as the second alarm wake-up time.

If the first alarm wake-up time 43 cannot satisfy the limit of longest tolerant delay times of the previous two first alarm wake-up times, for example, the first alarm wake-up time 43 is in the range of the longest tolerant delay time of the first alarm wake-up time 41, but is not in the range of the longest tolerant delay time of the first alarm wake-up time 42. Alternatively, the first alarm wake-up time 43 is only in the range of the longest tolerant delay time of the first alarm wake-up time 42. The Alarm Manager Service executes: determining to delay the first alarm wake-up time 41 until the first alarm wake-up time 42 only, ending the first merging, and restarting to execute the merging of the first alarm wake-up time 43 and a later first alarm wake-up time; in this case, it is equivalent that the first alarm wake-up time 42 is determined as the second alarm wake-up time.

When the Alarm Manager Service receives multiple first alarm wake-up times, the delay processing method of the first alarm wake-up times is the same as the foregoing method; that is, every time when receiving a first alarm wake-up time, the Alarm Manager Service performs judgment on the longest tolerant delay time so as to judge whether the newly received first alarm wake-up time is in the range of the longest tolerant delay times of all previous first alarm wake-up times; if yes, continuously delays the previous times until the newly received first alarm wake-up time; otherwise, determines the last time before the newly received first alarm wake-up time as the second alarm wake-up time, and ends the delay processing of the previous stage. It should be noted that, in this embodiment, as for each first alarm wake-up time, different longest tolerant delay times are set according to different settings of the corresponding applications.

Figure 8:
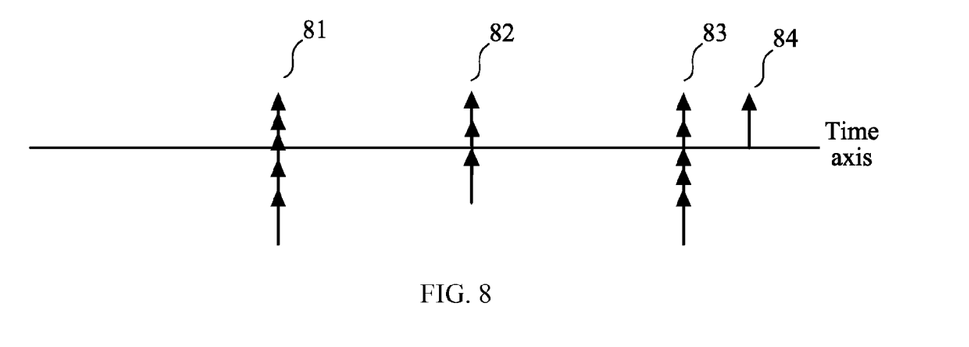
FIG. 8 is a schematic diagram of merging of alarm wake-up times in another embodiment of a wake-up control method for an intelligent terminal of the present invention.

The alarm timing and sequence shown in FIG. 4, after being merged by the method in this embodiment, becomes the sequence shown in FIG. 8, and FIG. 8 is a schematic diagram of merging of alarm wake-up times in another embodiment of a wake-up control method for an intelligent terminal of the present invention, originally 14 first alarm wake-up times in the FIG. 4 are merged to 4 second alarm wake-up times, that is, a second alarm wake-up time 81 to a second alarm wake-up time 84 shown in FIG. 8; the second alarm wake-up times are the first alarm wake-up times with the latest time that are in the range of the longest tolerant delay time and are determined according to the foregoing method. For example, the second alarm wake-up time 81 shows that the first alarm wake-up time 41 to the first alarm wake-up time 45 in the foregoing Table 1 are merged, so that the five first alarm wake-up times initiate an Alarm at the first alarm wake-up time 45; as compared with the prior art, in this embodiment, it is only required to set an Alarm at the four second alarm wake-up times, so as to wake up the intelligent terminal, and the wake-up originally required to be executed five times can be executed once now, thereby greatly reducing the system power consumption of the intelligent terminal.

Further, in the delay processing manner of this embodiment, when performing the judgment of the longest tolerant delay time, the Alarm Manager Service may also first judge whether the wake-up time corresponding to the alarm set indication is allowed to be adjusted; if it is allowed, execute delaying the multiple first alarm wake-up times until the second alarm wake-up time; otherwise, do not perform any adjustment on the wake-up time, that is, still wake up the terminal at the wake-up time. For example, some specific alarms in the intelligent terminal (for example, alarms of special application and system) are not allowed to be delayed.

Moreover, the setting of the longest tolerant delay time of each application is the same as the setting of the heartbeat moment in Embodiment 2, and cannot influence the normal running of the application either; that is, the longest tolerant delay time of the application may be obtained through testing or automatic learning, and it should be ensured that the longest tolerant delay time does not influence the normal running of the application.

Optionally, the delay of the wake-up time may also be performed in the following manner: for example, in the foregoing judging manner, when the first alarm wake-up time 42 is received, the first alarm wake-up time 42 may be increased by its corresponding longest tolerant delay time; it is assumed that a delayed time A is obtained after the first alarm wake-up time 42 is increased by the longest tolerant delay time, and it is assumed that a delayed time B is obtained after the first alarm wake-up time 41 is increased by its corresponding longest tolerant delay time; and then, the delayed time A and the delayed time B are compared, and the earliest one of the two is selected to serve as the second alarm wake-up time; in this case, it can be ensured that the second alarm wake-up time is in the range of the longest tolerant delay times of the first alarm wake-up time 42 and the first alarm wake-up time 41.

That is, the second alarm wake-up time is an earliest one in delayed times corresponding to the at least two first alarm wake-up times, and the delayed time is obtained after delaying the first alarm wake-up time by the corresponding longest tolerant delay time.

703: Wake up the intelligent terminal at the second alarm wake-up time.

The wake-up control method for an intelligent terminal of this embodiment can effectively reduce the number of wake-ups of the system in the standby state, so as to effectively reduce the power consumption of the intelligent terminal system. Verification is performed on an Android smart phone according to the foregoing method, when testing in the same condition, a standby current of the smart phone after being adjusted according to the method of the embodiment of the present invention can be reduced by about 10 to 40%, thereby significantly reducing the power consumption.

Figure 9:
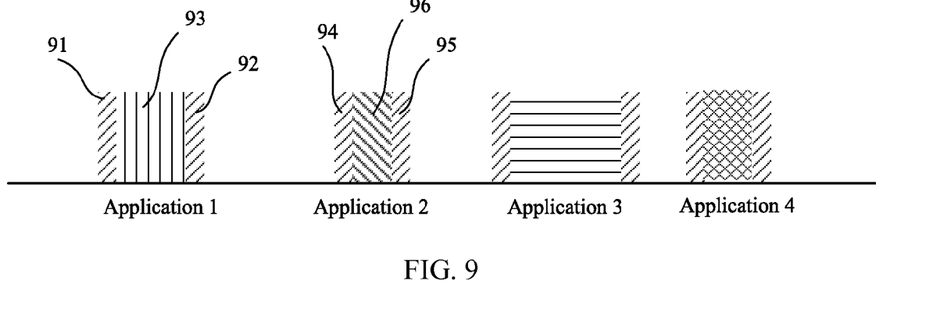
FIG. 9 is a first schematic diagram of electricity consumption in an embodiment of a wake-up control method for an intelligent terminal of the present invention.
Figure 10:
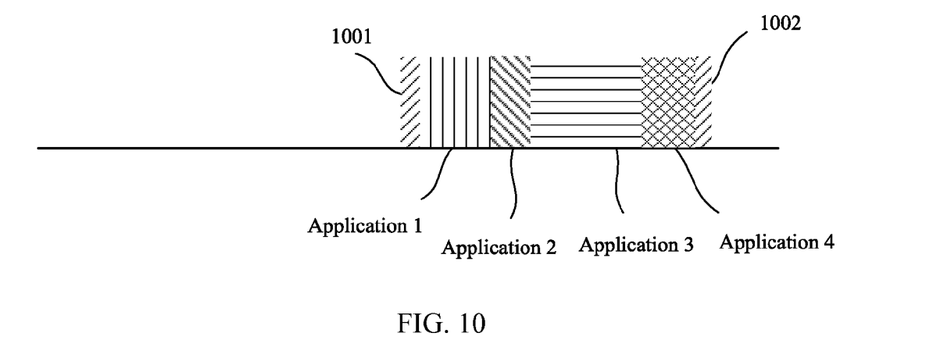
FIG. 10 is a second schematic diagram of electricity consumption in an embodiment of a wake-up control method for an intelligent terminal of the present invention.

The effect of the embodiment of the present invention may be illustrated with reference to FIG. 9 and FIG. 10, FIG. 9 is a first schematic diagram of electricity consumption in an embodiment of a wake-up control method for an intelligent terminal of the present invention, and FIG. 10 is a second schematic diagram of electricity consumption in an embodiment of a wake-up control method for an intelligent terminal of the present invention. It can be seen from FIG. 9 that, by taking an application 1 to an application 4 as an example, before adjustment through adopting the method of the embodiment of the present invention, the applications execute the wake-up of the intelligent terminal, respectively, and therefore, the application 1 generates electricity consumption 91 and electricity consumption 92 when waking up the terminal, where the electricity consumption 91 is the electricity consumed when the application 1 wakes up the intelligent terminal, and the electricity consumption 92 is the electricity consumed after the application 1 completes interaction with its network server and before the connection is broken, this is because even the application 1 completes the interaction, the intelligent terminal also has a detection process for detecting whether the application 1 still has data transmission with the network server, and whether interaction is being performed; if no interaction between the two is detected in a period of time, the intelligent terminal judges that the interaction between the application 1 and the network server is complete, and breaks the connection, and then, the electricity is still consumed in the period of time for detection, that is, the electricity consumption 92. Electricity consumption 93 exists between the electricity consumption 91 and the electricity consumption 92, and this is the electricity consumed when the application 1 interacts with its network server. Similarly, the application 2 also generates electricity consumption 94, electricity consumption 95, and electricity consumption 96 when running; another application is similar to this, which is not repeatedly described.

Referring to FIG. 10, originally four applications require waking up the terminal through four different alarms, respectively, and require executing wake-up four times; after adopting the wake-up control method for the intelligent terminal of the embodiment of the present invention, in the embodiment of the present invention, the four applications wake up the terminal through one alarm, and only require wake-up once. For example, as shown by W in FIG. 6, originally four first alarm wake-up times (corresponding to the application 1 to the application 4, respectively) exist, the four first alarm wake-up times are delayed until the heartbeat moment T1 for being merged, and only one alarm wake-up is executed, thereby greatly reducing the number of wake-ups. Moreover, it can also be obviously seen from the electricity consumption diagram of FIG. 10 that, for example, after waking up the intelligent terminal at the T1 moment, the application 1 to the application 4 start interaction with their respective network servers, and finally, after the four applications all complete the interaction, the intelligent terminal breaks the connection with the network server; therefore, during this process, only electricity consumption 1001 for waking up the terminal and electricity consumption 1002 before the connection is broken exist. Compare FIG. 9 and FIG. 10, it is very obvious that the electricity is greatly saved.

The reducing the power consumption of the intelligent terminal described in this embodiment includes the power consumption before and after the interaction of the application, for example, the electricity consumption 94 and the electricity consumption 95 of the application 2 shown in FIG. 9, after adopting the method of the embodiment of the present invention, in FIG. 10, it is equivalent that the electricity consumption 94 and the electricity consumption 95 generated by the application 2 do not exist. In FIG. 9, the four applications totally have 8 parts of electricity consumption (each application has two parts before and after the interaction, for example, the electricity consumption 94 and the electricity consumption 95), and in FIG. 10, only 2 parts of electricity consumption, that is, the electricity consumption 1001 and the electricity consumption 1002 exist, thereby reducing the power consumption of the intelligent terminal.

Moreover, the manner of Embodiment 2 is generally selected to perform delay processing, this is because in this manner, the heartbeat moment is fixedly set periodically, and it is simple to implement the manner. However, when the intelligent terminal has applications with relatively long periods and suitable for being merged by adopting the manner of Embodiment 3, and the number of wake-ups after merging is less than the number of wake-ups in the manner of Embodiment 2, it is preferable that Embodiment 3 is adopted. That is, in specific implementation, the two delay processing manners may be selected according to the actual situation.

In the embodiment of the present invention, optimization and adjustment are performed on the Alarm Manager Service in the intelligent terminal, and the applications are not limited and modified, for example, the applications still send alarm set indications for first alarm wake-up times to the Alarm Manager Service regularly according to their respective settings. In the embodiment of the present invention, when receiving the applications sent by the applications, the Alarm Manager Service only performs delay execution of the first alarm wake-up times indicated by the indications, so that the implementation is simple, and involves relatively small alternation.

Another embodiment provides a wake-up control method for an intelligent terminal, and the method is applicable to a solution of periodically setting heartbeat moments.

By taking a certain application on the intelligent terminal as an example, the application periodically sends an alarm set indication to indicate a first alarm wake-up time determined by the application for waking up the intelligent terminal, and a first time exists as an interval between each first alarm wake-up time and a first alarm wake-up time received last time. For example, it is assumed that the first time is 4 minutes, that is, the first alarm wake-up time set by the application indication is set every 4 minutes, that is, the terminal is woken every 4 minutes, so that the intelligent terminal is woken 15 times in 1 hour.

In this embodiment, periodical heartbeat moments are set, a set period of the heartbeat moments is a second time, and the second time is longer than the first time, for example, the second time is 5 minutes, that is, the heartbeat moment is set every 5 minutes. After receiving the alarm set indication sent by the application, the wake-up control apparatus delays its indicated first alarm wake-up time until an earliest heartbeat moment after the first alarm wake-up time, where the heartbeat moment until which the first alarm wake-up time is delayed may be referred to as a second alarm wake-up time, and wakes up the intelligent terminal at the second alarm wake-up time.

For example, by using the time $0^{th}$ minute on the time axis as a start, a heartbeat moment is set at a $5^{th}$ minute, and the application is set to execute one wake-up at a $4^{th}$ minute; according to the solution of the present invention, a wake-up control apparatus of the intelligent terminal delays the $4^{th}$ minute indicated by the application until the $5^{th}$ minute, that is, execute the wake-up at the $5^{th}$ minute; and similarly, the application then indicates setting a wake-up time at a $9^{th}$ minute, and the heartbeat moment is set at a $10^{th}$ minute, and then, the wake-up control apparatus delays the $9^{th}$ minute until the $10^{th}$ minute; and so on. It can be obtained that, by setting the heartbeat moment, the original 4-minute wake-up period of the application is modified to a 5-minute wake-up period, and the number of wake-ups within 1 hour is reduced to 12 from 15, thereby achieving the objective of reducing the energy consumption of the terminal.

An embodiment of the present invention further provides a wake-up control apparatus for an intelligent terminal. The apparatus can execute any method embodiment of the present invention, the apparatus is located in an Alarm Manager Service, and may be a part of the Alarm Manager Service, and the Alarm Manager Service may execute the foregoing method embodiments through the apparatus.

Figure 11:
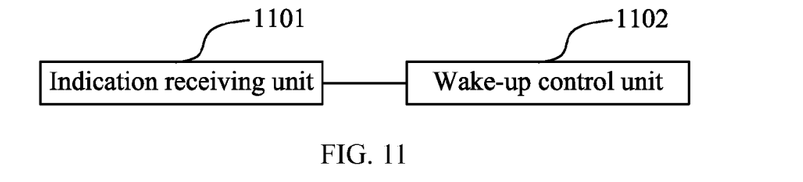
FIG. 11 is a schematic structural diagram of an embodiment of a wake-up control apparatus for an intelligent terminal of the present invention.

FIG. 11 is a schematic structural diagram of an embodiment of a wake-up control apparatus for an intelligent terminal of the present invention, and as shown in FIG. 11, the apparatus may include an indication receiving unit 1101 and a wake-up control unit 1102.

The indication receiving unit 1101 is configured to receive at least two alarm set indications sent by one or more applications of the intelligent terminal, where the alarm set indication is used to indicate a first alarm wake-up time determined by an application for waking up the intelligent terminal.

The wake-up control unit 1102 is configured to delay, at least two of at least two first alarm wake-up times corresponding to the at least two alarm set indications, until a second alarm wake-up time determined according to preset adjustment control information, and wake up the intelligent terminal at the second alarm wake-up time.

Figure 12:
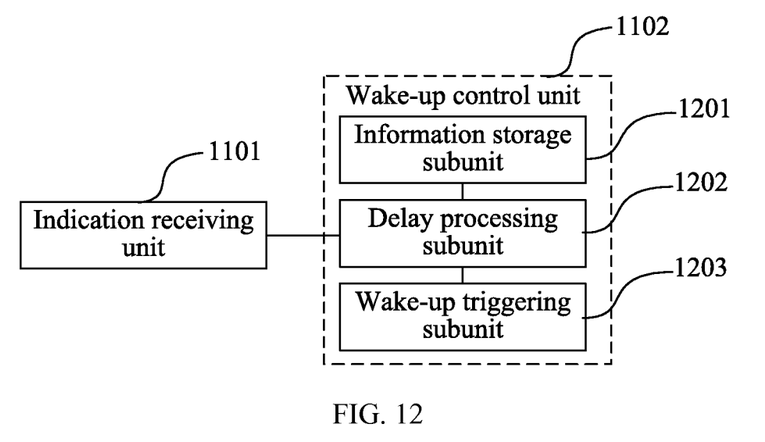
FIG. 12 is a schematic structural diagram of another embodiment of a wake-up control apparatus for an intelligent terminal of the present invention.

FIG. 12 is a schematic structural diagram of another embodiment of a wake-up control apparatus for an intelligent terminal of the present invention. In this embodiment, on the basis of the structure in FIG. 11, the wake-up control unit 1102 may include: an information storage subunit 1201, a delay processing subunit 1202, and a wake-up triggering subunit 1203.

The information storage subunit 1201 is configured to store the preset adjustment control information, where the adjustment control information is multiple periodically set heartbeat moments, the periodically set heartbeat moments include an $N^{th}$ heartbeat moment and an $(N+1)^{th}$ heartbeat moment that are adjacent to each other, the time of the $(N+1)^{th}$ heartbeat moment is later than that of the $N^{th}$ heartbeat moment, and the N is a natural number.

The delay processing subunit 1202 is configured to delay, at least two of the at least two first alarm wake-up times between the $N^{th}$ heartbeat moment and the $(N+1)^{th}$ heartbeat moment, until the $(N+1)^{th}$ heartbeat moment, where the $(N+1)^{th}$ heartbeat moment is the second alarm wake-up time; and the at least two first alarm wake-up times exist between the $N^{th}$ heartbeat moment and the $(N+1)^{th}$ heartbeat moment.

The wake-up triggering subunit 1203 is configured to wake up the intelligent terminal at the second alarm wake-up time.

Figure 13:
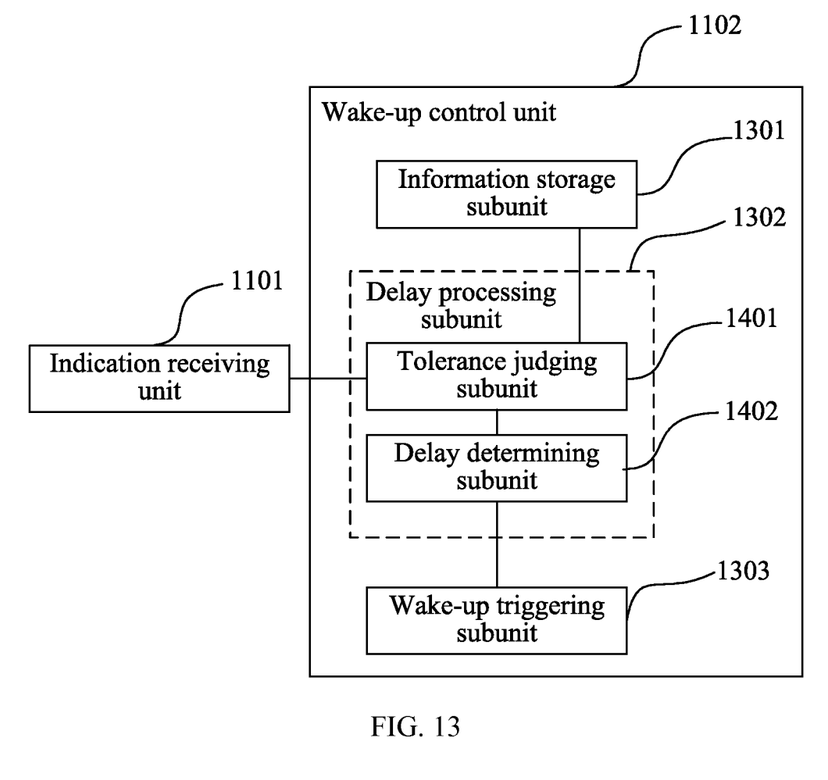
FIG. 13 is a schematic structural diagram of another embodiment of a wake-up control apparatus for an intelligent terminal of the present invention.

FIG. 13 is a schematic structural diagram of another embodiment of a wake-up control apparatus for an intelligent terminal of the present invention, and in this embodiment, on the basis of the structure in FIG. 11, the wake-up control unit 1102 may include: an information storage subunit 1301, a delay processing subunit 1302, and a wake-up triggering subunit 1303.

The information storage subunit 1301 is configured to store the preset adjustment control information, where the adjustment control information is a longest tolerant delay time of the first alarm wake-up time.

The delay processing subunit 1302 is configured to delay at least two of the at least two first alarm wake-up times until a second alarm wake-up time, where the second alarm wake-up time is the first alarm wake-up time with the latest time in the at least two first alarm wake-up times and is in a range of a longest tolerant delay time of the other first alarm wake-up time in the at least two first alarm wake-up times.

The wake-up triggering subunit 1303 is configured to wake up the intelligent terminal at the second alarm wake-up time.

Further, the delay processing subunit 1302 may further be configured to delay at least two of the at least two first alarm wake-up times until a second alarm wake-up time, where the second alarm wake-up time is an earliest one in delayed times corresponding to the at least two first alarm wake-up times, and the delayed time is obtained after delaying the first alarm wake-up time by the corresponding longest tolerant delay time.

Further, the delay processing subunit 1302 may include: a tolerance judging subunit 1401 and a delay determining subunit 1402.

The tolerance judging subunit 1401 is configured to judge whether the first alarm wake-up time corresponding to the currently received alarm set indication is in the range of the longest tolerant delay time, where the longest tolerant delay time includes longest tolerant delay times corresponding to other first alarm wake-up times before the first alarm wake-up time.

The delay determining subunit 1402 is configured to, when a judgment result is yes, delay the other first alarm wake-up times until the first alarm wake-up time, and the first alarm wake-up time is the second alarm wake-up time; otherwise, determine the first alarm wake-up time with the latest time in the other first alarm wake-up times to be the second alarm wake-up time, and delay the other first alarm wake-up times until the second alarm wake-up time; the other first alarm wake-up times are the at least two first alarm wake-up times.

Further, the wake-up control unit 1102 in this embodiment is specifically configured to modify, at least two of the at least two first alarm wake-up times corresponding to the at least two alarm set indications, into the second alarm wake-up time determined according to the preset adjustment control information.

The wake-up control apparatus for the intelligent terminal in the embodiment of the present invention is applied to the intelligent terminal, the intelligent terminal is a terminal having an intelligent operating system, such as a smart phone, an intelligent tablet computer, and an Ultrabook, and by adopting the apparatus, the number of waking up the intelligent terminal can be reduced, thereby reducing the power consumption of the intelligent terminal.

An embodiment provides a wake-up control apparatus for an intelligent terminal, including an indication receiving unit, configured to receive an alarm set indication sent by an application of the intelligent terminal, where the alarm set indication is used to indicate a first alarm wake-up time determined by the application for waking up the intelligent terminal, and a first time exists as an interval between the first alarm wake-up time and a first alarm wake-up time received last time, and a wake-up control unit, configured to delay the first alarm wake-up time until a second alarm wake-up time, where the second alarm wake-up time is an earliest heartbeat moment after the first alarm wake-up time in periodically set heartbeat moments, a set period of the heartbeat moment is a second time, and the second time is longer than the first time; and wake up the intelligent terminal at the second alarm wake-up time.

Another embodiment provides an intelligent terminal, the intelligent terminal includes a wake-up control apparatus as described in the embodiments of the present invention, and the wake-up control apparatus may be configured to execute the method in the embodiment of the present invention.

Figure 14:
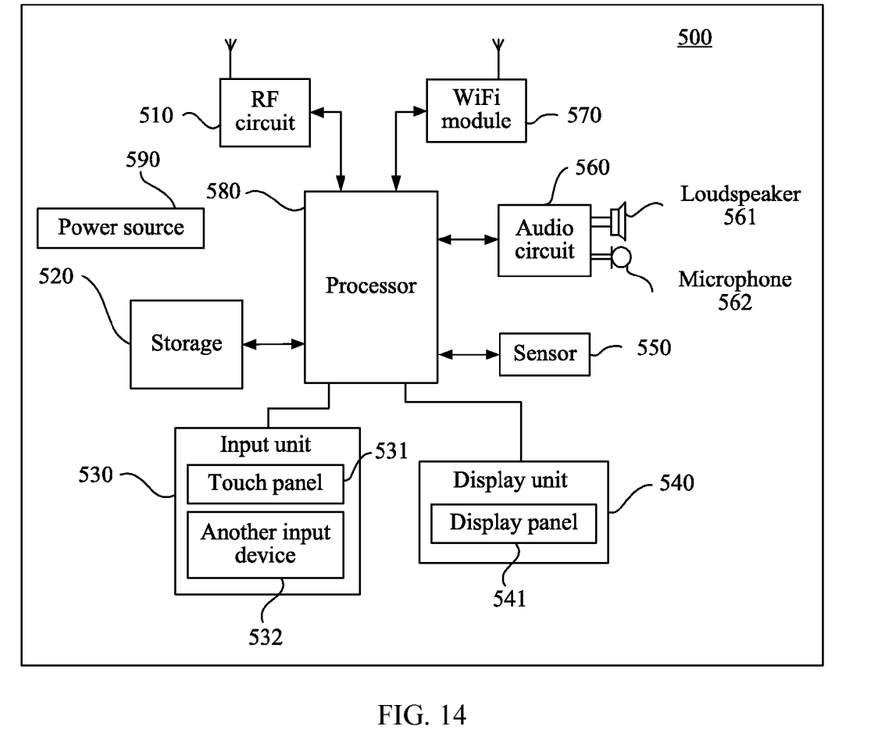
FIG. 14 is a schematic structural diagram of an intelligent terminal applied by a wake-up control apparatus for an intelligent terminal of the present invention.

FIG. 14 is a schematic structural diagram of an intelligent terminal applied by a wake-up control apparatus for an intelligent terminal of the present invention, as shown in FIG. 14, the intelligent terminal may be a terminal device such as a mobile phone, a tablet computer, a personal digital assistant (PDA), a point of sales (POS), and a car computer; by taking the intelligent terminal being a mobile phone as an example, FIG. 14 shows a block diagram of a part of the structure of a mobile phone 500 related to the intelligent terminal according to the embodiment of the present invention.

Referring to FIG. 14, the mobile phone 500 includes components such as a radio frequency (RF) circuit 510, a storage 520, an input unit 530, a display unit 540, a sensor 550, an audio circuit 560, a wireless fidelity (WiFi) module 570, a processor 580, and a power source 590. Persons skilled in the art can understand that, the structure of the mobile phone shown in FIG. 14 is only an example of an implementation manner, and does not intend to limit the mobile phone, and the structure may include components more or less than those shown in the drawing, or may combine some components, or may have different component deployment.

Construction components of the mobile phone 500 are specifically introduced in the following with reference to FIG. 14.

The RF circuit 510 may be configured to receive and send information, or receive and send a signal during a call process, particularly, receive downlink information of a base station, and send to the processor 580 for processing; in addition, send designed uplink data to the base station. Generally, the RF circuit includes, but not limited to, an antenna, at least one amplifier, a transceiver, a coupler, a low noise amplifier (LNA), a duplexer, and so on. Moreover, the RF circuit 510 may also communicate with another device through wireless communication and a network. The wireless communication may use any communication standard or protocol, including, but not limited to, global system of mobile communication (GSM), general packet radio service (GPRS), code division multiple access (CDMA), wideband code division multiple access (see WCDMA), and so on.

The storage 520 may be configured to store a software program and module, the processor 580, by running the software program and module stored in the storage 520, executes various functional application and data processing of the mobile phone 500. The storage 520 may mainly include a program storage area and a data storage area, where the program storage area may store an operating system, an application required by at least one function (such as sound playing function and image playing function), and so on; and the data storage area may store data created according to the usage of the mobile phone 500 (such as audio data and telephone book), and so on. Moreover, the storage 520 may include a high-speed random-access memory, and may further include a nonvolatile storage, such as at least one magnetic disk memory, a flash memory, or another volatile solid memory.

The input unit 530 may be configured to receive input number or character information, and generate key signal input related to user setting and function control of the mobile phone 500. Specifically, the input unit 530 may include a touch panel 531 and another input device 532. The touch panel 531, also referred to as a touchscreen, can collect a touch operation, on or near the touch panel, of a user (for example, an operation of the user on the touch panel 531 or near the touch panel 531 by using any suitable object or accessory such as a finger or a touchpen), and drive a corresponding connection apparatus according to a preset program. Optionally, the touch panel 531 may include two parts: a touch detection apparatus and a touch controller. The touch detection apparatus detects a touch direction of the user, detects a signal brought by the touch operation, and transmits the signal to the touch controller; the touch controller receives touch information from the touch detection apparatus, converts the information to coordinates of a touch point, and sends the coordinates to the processor 580, and the touch controller can also receive a command sent by the processor 580 and execute the command. Moreover, the touch panel 531 may be implemented in various types such as a resistance-type, a capacitance-type, an infrared type, and a surface acoustic wave type. In addition to the touch panel 531, the input unit 530 may further include another input device 532. Specifically, the another input device 532 may include, but not limited to, one or more of a physical keyboard, a functional key (such as a volume control key and a switch key), a trackball, a mouse, and an operating level.

The display unit 540 may be configured to display information input by the user or information provided for the user and various menus of the mobile phone 500. The display unit 540 may include a display panel 541, and optionally, the display panel 541 may be configured in form of a liquid crystal display (LCD), an organic light-emitting diode (OLED), and so on. Further, the touch panel 531 may cover the display panel 541, when detecting the touch operation on or near the touch panel, the touch panel 531 transmits the touch operation to the processor 580 to determine a type of a touch event, and then the processor 580 provides corresponding visual output on the display panel 541 according to the type of the touch event. In FIG. 14, the touch panel 531 and the display panel 541 are used as two independent components to implement input and output functions of the mobile phone 500, however, in some embodiments, the touch panel 531 and the display panel 541 may be integrated to implement the input and output functions of the mobile phone 500.

The mobile phone 500 may further include at least one sensor 550, such as an optical sensor, a motion sensor, and another sensor. Specifically, the optical sensor may include an ambient light sensor and a proximity sensor, where the ambient light sensor may adjust the brightness of the display panel 541 according to the brightness of the ambient light, and the proximity sensor may close the display panel 541 and/or backlight when the mobile phone 500 is moved near the ear. As a motion sensor, an accelerometer sensor may detect values of accelerations in various directions (generally in three axes), may detect the value and direction of the gravity when being static, and may be configured to identify applications of a mobile phone gesture (for example, switching between portrait and landscape orientation, related games, and magnetometer gesture correction), vibration identification related function (such as a pedometer, and knocks), and so on. The mobile phone 500 may be further configured with a gyroscope, a barometer, a hygrometer, a thermometer, an infrared sensor, and other sensors, which are not repeatedly described here again.

The audio circuit 560, a loud speaker 561, and a microphone 562 may provide audio interfaces between the user and the mobile phone 500. The audio circuit 560 may transmit an electrical signal converted from the received audio data to the loudspeaker 561, and the loudspeaker 561 converts the electrical signal to a sound signal for output; on the other hand, the microphone 562 converts a collected sound signal into an electrical signal, the audio circuit 560 receives the electrical signal, converts the electrical signal into the audio data, and output the audio data to the processor 580 for processing, and then the processed audio data is sent to, for example, another mobile phone through the RF circuit 510, or the audio data is output to the storage 520 for further processing.

WiFi belongs to a short-distance wireless transmission technology, the mobile phone 500 may help the user to receive and send emails, browse WebPages, access stream media, and so on, through the WiFi module 570, and the WiFi module 570 provides wireless broadband Internet access for the user. FIG. 14 shows the WiFi module 570, however, it should be understood that, it is not necessary for the construction of the mobile phone 500, and can completely be omitted according to requirements and without changing the scope of the essence of the present invention.

The processor 580 is a control center of the mobile phone 500, connects to various parts of the whole mobile phone by using various interfaces and lines, and executes various functions of the mobile phone 500 and processes data through running or executing software program and/or module stored in the storage 520 and invoking the data stored in the storage 520, so as to perform whole monitoring on the mobile phone. Optionally, the processor 580 may include one or more processing units. Preferentially, the processor 580 may integrate an application processor and a modulation-demodulation processor, where the application processor mainly processes the operating system, a user interface, an application, and so on, and the modulation-demodulation processor mainly processes wireless communication. It should be understood that, the modulation-demodulation processor may also not be integrated in the processor 580.

The mobile phone 500 further includes the power source 590 (for example, a battery) supplying power for various parts, and preferentially, the power source may be logically connected to the processor 580 through a power source management system, so as to implement functions, such as charging management, discharging, and power consumption management, through the power source management system.

Although not shown, the mobile phone 500 may further include a camera, a Bluetooth module, and so on, which are not repeatedly described here again.

In the embodiment of the present invention, a program storage area in the storage 520 of the intelligent terminal stores a program code used to execute the method in the embodiment of the present invention, and a data storage area stores first alarm wake-up times corresponding to multiple alarm set indications sent by the applications, and determined second alarm wake-up times, and so on; and the processor 580 in this embodiment may invoke the program code and relevant information which are stored in the storage 520 to execute the following processing receiving at least two alarm set indications sent by one or more applications of the intelligent terminal, where the alarm set indication is used to indicate a first alarm wake-up time determined by the application for waking up the intelligent terminal, and delaying, at least two of at least two first alarm wake-up times corresponding to the at least two alarm set indications, until a second alarm wake-up time determined according to preset adjustment control information, and waking up the intelligent terminal at the second alarm wake-up time.

The processor may be further configured to execute other steps in the method embodiment, which are not described one by one here.

Persons of ordinary skill in the art should understand that all or a part of the steps of the foregoing method embodiments may be implemented by a program instructing relevant hardware. The program may be stored in a computer readable storage medium. When the program is executed, the steps of the foregoing method embodiments are performed. The foregoing storage medium may be various mediums capable of storing program codes, such as a ROM, a RAM, a magnetic disk, or a compact disk, and so on.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they can still make modifications to the technical solutions recorded in the foregoing embodiments, or make equivalent replacements to some or all of the technical features in the technical solutions; and these modifications or replacements do not make the essence of corresponding technical solutions depart from the scope of the technical solutions of the embodiments of the present invention.

What is claimed is:

1. A method of waking up a terminal, the method comprising:
   receiving at least three indications sent from at least three software applications of the terminal, each indication of the at least three indications being determined by one of the at least three software applications and being used to indicate a time for waking up the terminal to connect a network server;
   determining a first time for waking up the terminal to connect a first network server, the first time being indicated by a first indication of the at least three indications, the first indication being received before the first time, the first time being associated with a first delay;
   determining a second time for waking up the terminal to connect a second network server, the second time being indicated by a second indication of the at least three indications, the second indication being received before the second time, the second time being associated with a second delay;
   determining a third time for waking up the terminal to connect a third network server, the third time being indicated by a third indication of the at least three indications, the third indication being received before the third time, the third time being associated with a third delay; and
   in a case that the third time is equal to or larger than each of the first time and the second time, a difference between the third time and the first time is less than or equal to the first delay, and a difference between the third time and the second time is less than or equal to the second delay, waking up the terminal in accordance with the third time to connect the first network server, the second network server and the third network server.

2. The method of claim 1, wherein at least one of the at least three indications is used to indicate a repetitive time for periodically waking up the terminal to connect a network server.

3. The method of claim 1, wherein the first delay is an acceptable delay by a first software application of the at least three software applications, the first indication being sent by the first software application.

4. The method of claim 1, wherein the second delay is an acceptable delay by a second software application of the at least three software applications, the second indication being sent by the second software application.

5. The method of claim 1, wherein the terminal is in a dormant state before the terminal is woken up.

6. The method of claim 1, wherein at least one of the at least three indications is periodically sent from one of the at least three software applications of the terminal.

7. The method of claim 1, further comprising:
   in the case that the third time is equal to or larger than each of the first time and the second time, the difference between the third time and the first time is less than or equal to the first delay, and the difference between the third time and the second time is less than or equal to the second delay, the terminal is not woken up in accordance with the first time to connect the first network server and the terminal is not woken up in accordance with the second time to connect the second network server.

8. A terminal comprising at least one processor and a non-transitory computer readable medium coupled to the at least one processor and storing computer-executable code which, when executed, instructs the at least one processor to perform the following:
   receiving at least three indications sent from at least three software applications of the terminal, each indication of the at least three indications being determined by one of the at least three software applications and being used to indicate a time for waking up the terminal to connect a network server;
   determining a first time for waking up the terminal to connect a first network server, the first time being indicated by a first indication of the at least three indications, the first indication being received before the first time, the first time being associated with a first delay;
   determining a second time for waking up the terminal to connect a second network server, the second time being indicated by a second indication of the at least three indications, the second indication being received before the second time, the second time being associated with a second delay;

determining a third time for waking up the terminal to connect a third network server, the third time being indicated by a third indication of the at least three indications, the third indication being received before the third time, the third time being associated with a third delay; and in a case that the third time is equal to or larger than each of the first time and the second time, a difference between the third time and the first time is less than or equal to the first delay, and a difference between the third time and the second time is less than or equal to the second delay, waking up the terminal in accordance with the third time to connect the first network server, the second network server and the third network server.

9. The terminal according to claim 8, wherein at least one of the at least three indications is used to indicate a repetitive time for periodically waking up the terminal to connect a network server.

10. The terminal according to claim 8, wherein the first delay is an acceptable delay by a first software application of the at least three software applications, the first indication being sent by the first software application.

11. The terminal according to claim 8, wherein the second delay is an acceptable delay by a second software application of the at least three software applications, the second indication being sent by the second software application.

12. The terminal according to claim 8, wherein the terminal is in a dormant state before the terminal is woken up.

13. The terminal according to claim 8, at least one of the at least three indications is periodically sent from one of the at least three software applications of the terminal.

14. A terminal, comprising an RF circuit, a computer readable storage medium, and a processor, the processor being configured to execute a software program stored in the computer readable storage medium to perform the following:

receiving at least three indications sent from at least three software applications of the terminal, each indication of the at least three indications being determined by one of the at least three software applications and being used to indicate a time for waking up the terminal to connect a network server through the RF circuit;

determining a first time for waking up the terminal to connect a first network server, the first time being indicated by a first indication of the at least three indications, the first indication being received before the first time, the first time being associated with a first delay;

determining a second time for waking up the terminal to connect a second network server, the second time being indicated by a second indication of the at least three indications, the second indication being received before the second time, the second time being associated with a second delay;

determining a third time for waking up the terminal to connect a third network server, the third time being indicated by a third indication of the at least three indications, the third indication being received before the third time, the third time being associated with a third delay; and in a case that the third time is equal to or larger than each of the first time and the second time, a difference between the third time and the first time is less than or equal to the first delay, and a difference between the third time and the second time is less than or equal to the second delay, waking up the terminal in accordance with the third time to connect the first network server, the second network server and the third network server through the RF circuit.

15. The terminal of claim 14, wherein at least one of the at least three indications is used to indicate a repetitive time for periodically waking up the terminal to connect a network server.

16. The terminal of claim 14, wherein the first delay is an acceptable delay by a first software application of the at least three software applications, the first indication being sent by the first software application.

17. The terminal of claim 14, wherein the second delay is an acceptable delay by a second software application of the at least three software applications, the second indication being sent by the second software application.

18. The terminal of claim 14, wherein the terminal is in a dormant state before the terminal is woken up.

19. The terminal of claim 14, wherein at least one of the at least three indications is periodically sent from one of the at least three software applications of the terminal.

20. A terminal, comprising:

means for receiving at least three indications sent from at least three software applications of the terminal, each indication of the at least three indications being determined by one of the at least three software applications and being used to indicate a time for waking up the terminal to connect a network server;

means for determining a first time for waking up the terminal to connect a first network server, the first time being indicated by a first indication of the at least three indications, the first indication being received before the first time, the first time being associated with a first delay;

means for determining a second time for waking up the terminal to connect a second network server, the second time being indicated by a second indication of the at least three indications, the second indication being received before the second time, the second time being associated with a second delay;

means for determining a third time for waking up the terminal to connect a third network server, the third time being indicated by a third indication of the at least three indications, the third indication being received before the third time, the third time being associated with a third delay; and means for waking up the terminal in accordance with the third time to connect the first network server, the second network server and the third network server in a case that the third time is equal to or larger than each of the first time and the second time, a difference between the third time and the first time is less than or equal to the first delay, and a difference between the third time and the second time is less than or equal to the second delay.

* * * * *